United States Patent
Wright

(10) Patent No.: US 11,791,992 B2
(45) Date of Patent: Oct. 17, 2023

(54) COMPUTER IMPLEMENTED METHOD AND SYSTEM FOR TRANSFERRING CONTROL OF A DIGITAL ASSET

(71) Applicant: nChain Licensing AG, Zug (CH)

(72) Inventor: Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 353 days.

(21) Appl. No.: 16/977,406

(22) PCT Filed: Feb. 19, 2019

(86) PCT No.: PCT/IB2019/051326
§ 371 (c)(1),
(2) Date: Sep. 1, 2020

(87) PCT Pub. No.: WO2019/166915
PCT Pub. Date: Sep. 6, 2019

(65) Prior Publication Data
US 2021/0042829 A1 Feb. 11, 2021

(30) Foreign Application Priority Data

Mar. 2, 2018 (GB) ...................................... 1803396
Mar. 2, 2018 (WO) .................. PCT/IB2018/051338

(51) Int. Cl.
*H04L 9/08* (2006.01)
*G06Q 20/12* (2012.01)
(Continued)

(52) U.S. Cl.
CPC ......... *H04L 9/085* (2013.01); *G06Q 20/1235* (2013.01); *G06Q 20/3825* (2013.01);
(Continued)

(58) Field of Classification Search
CPC ........... G06Q 20/1235; G06Q 20/3825; G06Q 20/3829; G06Q 40/04; G06Q 2220/10;
(Continued)

(56) References Cited

U.S. PATENT DOCUMENTS 10,050,779 B2    8/2018  Alness et al.
10,511,436 B1 * 12/2019 Machani ................. H04L 9/085
(Continued)

FOREIGN PATENT DOCUMENTS

CN      106533675 A    3/2017
CN      106548345 A    3/2017
(Continued)

OTHER PUBLICATIONS

"Gennaro et al. Robust Threshold DSS Signatures, 1996, Advances in Cryptography—Eurocrypt '96, pp. 354-371" (Year: 1996).*
(Continued)

*Primary Examiner* — Courtney P Jones
(74) *Attorney, Agent, or Firm* — Davis Wright Tremaine LLP

(57) ABSTRACT

A method of transferring control of a digital asset (2) is disclosed. The method comprises distributing shares $d_{Ai}$ of a first private key $d_A$ of an elliptic curve cryptography (ECC) system among a plurality of first participants (4). The first private key is accessible by means of a first threshold number (6) of shares $d_{Ai}$ of the first private key, and is inaccessible in the absence of the first threshold number of shares, and access to the digital asset (2) is provided by digital signature of a first encrypted message with the first private key. Shares of a deterministic key $D_k$ of the cryptography system are distributed among the either the first participants or a plurality of second participants, wherein the deterministic key is accessible by means of a second threshold number of shares of the deterministic key, and is (Continued)

Figure 1:
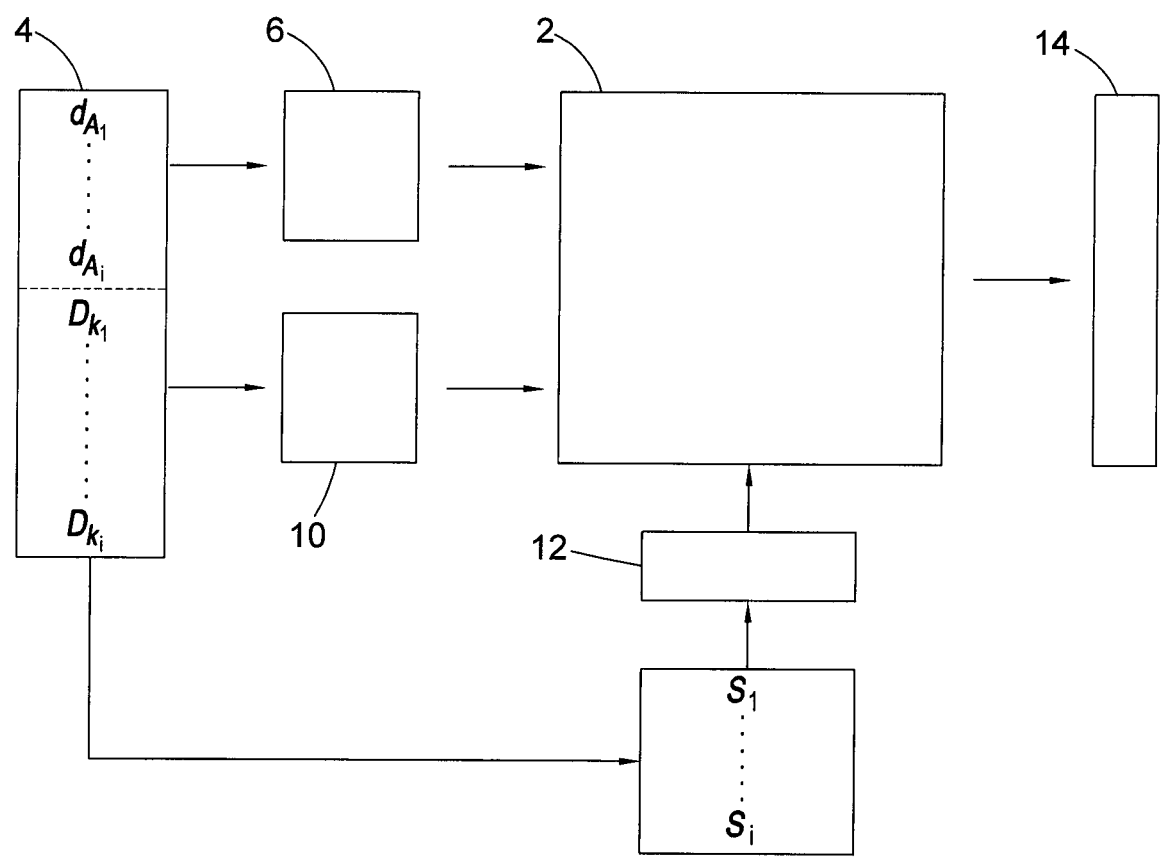

inaccessible in the absence of the second threshold number of shares. A second encrypted message is provided wherein access to the digital asset (2) is provided by digital signature of the second encrypted message with a second private key $d_A + D_k$ of the cryptography system, wherein the second private key is related to said first private key by the deterministic key $D_k$. Shares S (of the second encrypted message signed with the second private key are generated, wherein the second encrypted message can be signed with the second private key by means of a third threshold number (12) of shares of the signed message, and cannot be signed in the absence of the third threshold number of shares.

20 Claims, 2 Drawing Sheets

(51) Int. Cl.
| | |
|---|---|
| *G06Q 20/38* | (2012.01) |
| *H04L 9/32* | (2006.01) |
| *H04L 9/00* | (2022.01) |
| *G06Q 40/04* | (2012.01) |
| *H04L 9/30* | (2006.01) |

(52) U.S. Cl.
CPC ......... *G06Q 20/3829* (2013.01); *G06Q 40/04* (2013.01); *H04L 9/3066* (2013.01); *H04L 9/3255* (2013.01); *G06Q 20/389* (2013.01); *G06Q 2220/00* (2013.01); *G06Q 2220/10* (2013.01); *G06Q 2230/00* (2013.01); *H04L 9/50* (2022.05); *H04L 2209/463* (2013.01)

(58) Field of Classification Search
CPC ....... H04L 9/008; H04L 9/085; H04L 9/3073; H04L 9/3255; H04L 2209/56
USPC ........................................................ 705/51
See application file for complete search history.

(56) References Cited

U.S. PATENT DOCUMENTS

| | | | |
|---|---|---|---|
| 2001/0055388 | A1 | 12/2001 | Kaliski |
| 2007/0118746 | A1 | 5/2007 | Lauter et al. |
| 2016/0212109 | A1 | 7/2016 | Hird |
| 2016/0344543 | A1 | 11/2016 | Alness et al. |
| 2017/0213210 | A1 | 7/2017 | Kravitz |
| 2017/0250972 | A1 | 8/2017 | Ronda et al. |
| 2018/0011996 | A1* | 1/2018 | Dolev ............... G06F 21/14 |
| 2018/0054316 | A1 | 2/2018 | Tomlinson et al. |
| 2018/0234251 | A1* | 8/2018 | Oberheide ........ G06F 21/40 |
| 2018/0278594 | A1* | 9/2018 | Schiffman ........ H04L 9/3255 |
| 2019/0007205 | A1* | 1/2019 | Corduan ........... H04L 63/062 |
| 2021/0111875 | A1* | 4/2021 | Le Saint .......... H04L 9/085 |

FOREIGN PATENT DOCUMENTS

| | | |
|---|---|---|
| CN | 106982205 A | 7/2017 |
| WO | 2015160839 A1 | 10/2015 |
| WO | 2017145016 A1 | 8/2017 |
| WO | 2017145018 A1 | 8/2017 |
| WO | 2017151861 A1 | 9/2017 |
| WO | 2018007828 A2 | 1/2018 |

OTHER PUBLICATIONS

Anonymous, "Delegated Proof-of Stake Concensus," bitshares.org, retrieved from https://web.archive.org/web/20170507054311/https://bitshares.org/technology/delegated-proof-of-stake-consensus/ Jun. 13, 2022 [archived May 7, 2017], 5 pages.

Antonopoulos, "Mastering Bitcoin—Unlocking Digital Cryptocurrencies," O'Reilly Media, Inc., Dec. 20, 2014, 282 pages.

Gennaro et al., "Robust Threshold DSS Signatures," International Conference on the Theory and Applications of Cryptographic Techniques, May 12, 1996, https://link.springer.com/content/pdf/10.1007%2F3-540-68339-9_31.pdf, 18 pages.

Gennaro et al., "Threshold—Optimal DSA/ECDSA Signatures and an Application to Bitcoin Wallet Security," retrieved from https://eprint.iacr.org/2016/013.pdf, 2016, 42 pages.

Goldfeder et al., "Securing Bitcoin Wallets via a New DSA/ECDSA Threshold Signature Scheme," retrieved from https://www.cs.princeton.edu/~stevenag/threshold_sigs.pdf, 26 pages.

Goldfeder et al., "Securing Bitcoin wallets via threshold signatures," retrieved from http://www.cs.princeton.edu/~stevenag/bitcoin_threshold_signatures.pdf, Jun. 3, 2014, 11 pages.

Green et al., "Strength in Numbers: Threshold ECDSA to Protect Keys in the Cloud," Worcester Polytechnic Institute, retrieved from https://eprint.iacr.org/2015/1169.pdf, 2015, 19 pages.

Ibrahim, "SecureCoin: A Robust Secure and Efficient Protocol for Anonymous Bitcoin Ecosystem," International Journal of Network Security 19(2):295-312, http://ijns.jalaxy.com.tw/contents/ijns-v19-n2/ijns-2017-v19-n2-p295-312.pdf, Mar. 2017, 18 pages.

International Search Report and Written Opinion dated Nov. 15, 2018, Patent Application No. PCT/IB2018/051338, 12 pages.

Nakamoto, "Bitcoin: A Peer-to-Peer Electronic Cash System," Bitcoin, Oct. 31, 2008, https://bitcoin.org/bitcoin.pdf, 9 pages.

NChain, "nChain's Inventions to Enable Bitcoin's Future—Jimmy Nguyen—Hong Kong 2017," <https://www.youtube.com/watch?v=-D5V6ldw0sQ>, Sep. 21, 2017, 37 pages.

NChain, "Threshold (Signature) of Greatness—Dr. Craig Wright—Hong Kong 2017," https://www.youtube.com/watch?v=GUg2mocV9TI, Sep. 26, 2017, 17 pages.

Satoshi et al., "Connection Limits," Bitcoin Forum, Aug. 9, 2010, https://bitcointalk.org/index.php?topic=741.0;prev_next=prev, 2 pages.

Shamir, "How to Share a Secret," Massachusetts Institute of Technology, 22(11): Nov. 1979, 2 pages.

UK Commercial Search Report dated Jul. 13, 2018, Patent Application No. GB1803396.9, 8 pages.

Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.

\* cited by examiner

COMPUTER IMPLEMENTED METHOD AND SYSTEM FOR TRANSFERRING CONTROL OF A DIGITAL ASSET

This invention relates generally to the security of data and computer-based resources. More particularly, it relates to cryptocurrencies and cryptography, and also to Elliptic Curve Cryptography, Elliptic Curve Digital Signature Algorithm (ECDSA) and Threshold Cryptography. It can be used to advantage in relation to blockchain-implemented cryptocurrencies such as (for example) Bitcoin but is not limited in this regard, and can have wider applicability. The invention may, in one embodiment, be described as providing a threshold digital signature scheme.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration only, it should be noted that the invention is not limited to use with the Bitcoin blockchain and alternative blockchain implementations and protocols fall within the scope of the present invention.

A blockchain is a peer-to-peer, electronic ledger which is implemented as a computer-based decentralised system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception.

The concept of decentralisation is fundamental to the Bitcoin methodology. Decentralised systems provide the advantage that, unlike distributed or centralised systems, there is no single point of failure. Therefore, they offer an enhanced level of security and resilience. This security is further enhanced by the use of known cryptographic techniques such as Elliptic Curve Cryptography and ECDSA.

However, while the Bitcoin protocol itself has proved resilient to any significant attack at the time of filing the present application, there have been attacks on exchanges and wallets which supplement or build upon the Bitcoin network. As the value of Bitcoin increases, more incidents such as those involving Mt Gox and Bitfinex are likely to occur in standard centralised systems.

Thus, there is a need for a solution which further enhances the security of such systems. The invention provides such an advantage, amongst others.

The present invention provides method(s) and system(s) as defined in the appended claims.

In accordance with the invention, there may be provided a method of transferring control of a digital asset, the method comprising:

distributing shares of at least one first secret value among a plurality of first participants, wherein at least one said first secret value is a first private key of a first private-public key pair of a cryptography system having a homomorphic property, said first secret value is accessible by means of a first threshold number of said shares of said first secret value, and is inaccessible in the absence of said first threshold number of shares of said first secret value, and access to said digital asset is provided by digital signature of a first encrypted message with said first private key;

distributing shares of at least one second secret value among said plurality of first participants, wherein at least one said second secret value is a deterministic key of said cryptography system, said second secret value is accessible by means of a second threshold number of said shares of said second secret value, and is inaccessible in the absence of said second threshold number of shares of said second secret value;

providing a second encrypted message wherein access to said digital asset is provided by digital signature of said second encrypted message with a second private key of a second private-public key pair of said cryptography system, and wherein said second private key is related to said first private key by said deterministic key; and generating shares of at least one third secret value, wherein at least one said third secret value is said second encrypted message signed with said second private key, and wherein said second encrypted message can be signed with said second private key by means of a third threshold number of said shares of said third secret value, and cannot be signed in the absence of said third threshold number of shares of said third secret value.

By providing a second encrypted message wherein access to said digital asset is provided by digital signature of said second encrypted message with a second private key of a second private-public key pair of said cryptography system, and wherein said second private key is related to said first private key by said deterministic key, generating shares of at least one third secret value, wherein at least one said third secret value is said second encrypted message signed with said second private key, and wherein said second encrypted message can be signed with said second private key by means of a third threshold number of said shares of said third secret value, and cannot be signed in the absence of said third threshold number of shares of said third secret value, this provides the advantage of enabling control of a digital asset to be transferred from a threshold number of shares in a first private key, to a threshold number of shares in a second private key, in a secure and easy manner by use of the deterministic key. Also, by distributing shares of the deterministic key, this provides the advantage of enabling the number of participants in the signature scheme to be easily changed. As a result, further reliability and security of operation can be achieved, for example, if security of one or more of the participants is compromised. This also provides the further advantage of enabling easy increase of the number of participants in the signature scheme.

The method may further comprise distributing a version of said deterministic key, encrypted by means of said cryptography system, to a plurality of second participants, wherein said homomorphic property enables derivation of said second public key from said first public key and said version of said deterministic key.

The shares communicated to each said first and/or second participant may be inaccessible to each other said first and/or second participants.

This provides the advantage of providing further security and preventing unauthorised use of the private keys.

The step of communicating said shares to each said first and/or second participant may comprise providing a respective encrypted communication channel with the or each said first and/or second participant.

The step of distributing shares of at least one said first secret value may comprise:

distributing respective first shares of a fourth secret value, known to a third participant, to a plurality of fourth participants, wherein said first shares are encrypted by means of at least one third private-public key pair of said cryptography system, wherein a fourth threshold number of first shares is required in order to enable a said fourth participant to determine the fourth secret value;

receiving, from each of a plurality of said fourth participants, at least one second share of a respective fifth secret value known to said fourth participant, wherein said second shares are encrypted by means of at least one fourth private-public key pair of said cryptography system, and a fifth threshold number of second shares is required in order to enable a participant other than said fourth participant to determine the fifth secret value; and forming, from a plurality of said second shares, a third share of a said first secret value, wherein said first threshold number of third shares is required in order to enable the first secret value to be determined.

By forming, from a plurality of said second shares, a third share of the first secret value, wherein the first threshold number of third shares is required in order to enable the first secret value to be determined, this provides the advantage of improving security of the method, since it is no longer necessary for private keys corresponding to the fourth and fifth secret values to be disclosed or stored in memory.

The first and second shares of said fourth and fifth secret values may be created by means of respective Shamir secret sharing schemes.

The method may further comprise communicating versions of said first shares, encrypted by means of said cryptography system, to each of a plurality of said fourth participants.

This provides the advantage of enabling consistency of shares received from different fourth participants to be checked without disclosing private keys or shares, thereby enabling suspected untrustworthy participants to be ignored without comprising security of the method.

The method may further comprise determining a version of at least one first secret value, encrypted by means of said cryptography system.

A plurality of said first shares may be respective values of a first polynomial function, and the first secret value may be determined by deriving the polynomial function from said first threshold number of said shares.

A plurality of said first shares may be respective values of a second polynomial function, and the method may further comprise communicating versions of coefficients of said second polynomial function, encrypted by means of said cryptography system, to each of a plurality of said fourth participants.

This provides the advantage of enabling consistency of the first shares received directly from the third participant and the first shares, encrypted by means of said cryptography system, received from the fourth participants, to be verified, without compromising the security of the method, by reconstructing the second polynomial function.

The method may further comprise verifying consistency of versions of said first shares received directly from said third participant with versions of said first shares, encrypted by means of said cryptography system and received from a plurality of said fourth participants.

This provides the advantage of enabling potentially untrustworthy participants to be identified without compromising security of the method.

The method may further comprise verifying consistency of versions of said first shares, encrypted by means of said cryptography system and received from one said fourth participant with versions of said first shares, encrypted by means of said cryptography system and received from another said fourth participant.

This also provides the advantage of enabling potentially untrustworthy participants to be identified without compromising security of the method.

The method may further comprise the step of distributing respective fourth shares of a sixth secret value, having value zero, to a plurality of fourth participants, wherein said fourth shares are encrypted by means of at least one fifth private-public key pair of said cryptography system.

This provides the advantage of enabling shares and or private keys to be updated, thereby enabling non-secure or inconsistent participants to be removed from participation.

The method may further comprise receiving at least one said fourth share from a said fourth participant, and forming, from said third share and said fourth share, a fifth share of said first secret value, wherein a sixth threshold number of fifth shares is required in order to enable the first secret value to be determined At least one said first secret value may be shared among a plurality of said first participants by means of joint random secret sharing (JRSS).

This provides the advantage of increasing security by preventing any single first participant from having access to the first secret value.

Sharing at least one said first secret value may include sharing masking shares generated by joint zero secret sharing (JZSS).

This provides the advantage of making digital signatures easier to generate, without compromising security of the system.

The cryptography system may be an elliptic curve cryptography system, said public key of each said public-private key pair may be related to the corresponding private key by multiplication of an elliptic curve generator point by said private key, and said second private key may be related to said first private key by addition of said deterministic key to said first private key.

The invention also provides a system, comprising:
a processor; and
memory including executable instructions that, as a result of execution by the processor, causes the system to perform any embodiment of the computer-implemented method described herein.

The invention also provides a non-transitory computer-readable storage medium having stored thereon executable instructions that, as a result of being executed by a processor of a computer system, cause the computer system to at least perform an embodiment of the computer-implemented method described herein.

Figure 2:
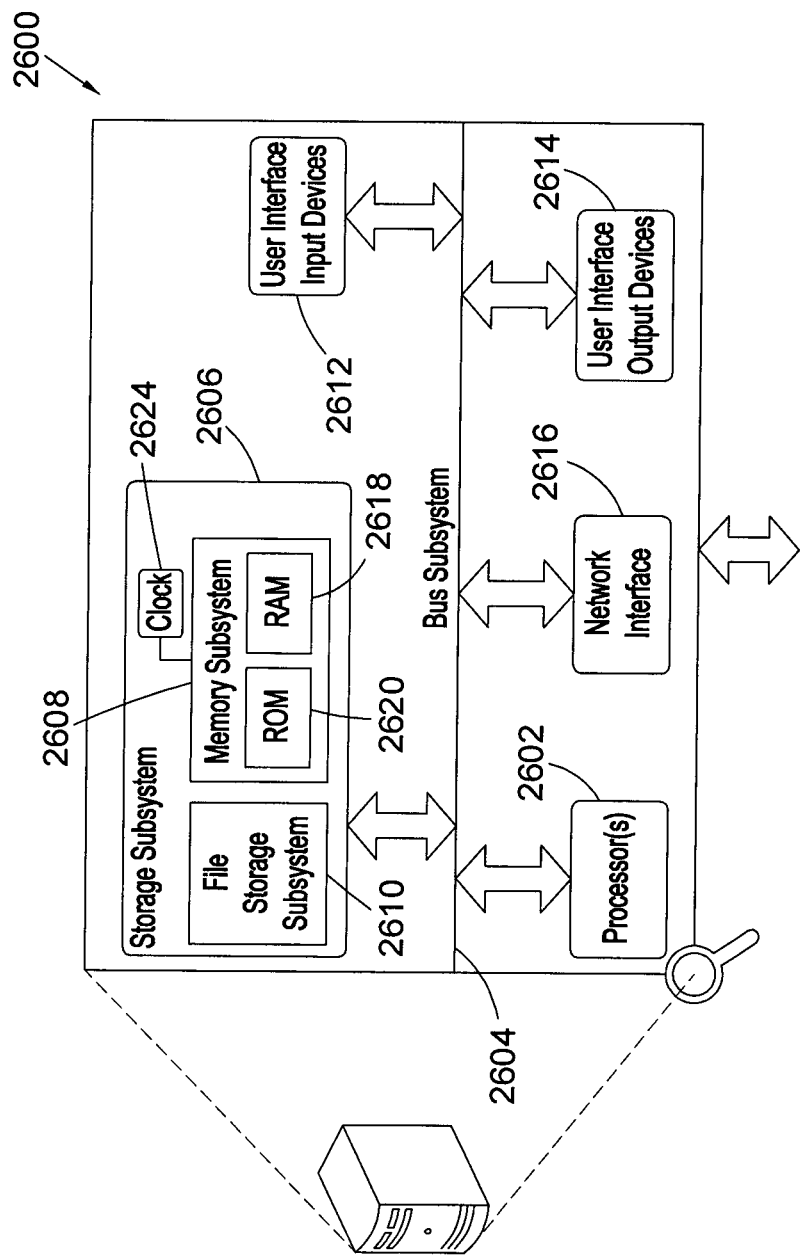

These and other aspects of the present invention will be apparent from and elucidated with reference to, the embodiment described herein. An embodiment of the present invention will now be described, by way of example only, and with reference to the accompany drawings, in which:

FIG. 1 is a schematic diagram of a system embodying the present invention for transferring control of a digital asset in the form of a cryptocurrency; and FIG. 2 is a schematic diagram illustrates a computing environment in which various embodiments can be implemented.

PRIOR WORK

Shamir Secret Sharing Scheme (SSSS)

Shamir (1979) first introduced a dealer based secret sharing scheme that allowed for a distributed management of keys. The problems associated with this scheme come from the necessity of trusting a dealer who cannot be verified. This form of the scheme is fully compatible with the system disclosed in the present application and can be used for group distribution of individual key slices that are created through the process noted herein.

Joint Random Secret Sharing (JRSS) (Pedersen, 1992)

The stated aim of this procedure is to create a method where a group of participants may collectively share a secret without any participant having knowledge of the secret. Each participant selects a random value as their local secret and distributes a value derived from this using SSSS with the group. Each participant then adds all the shares received from the participants, including its own. This sum is the joint random secret share. The randomness offered by a single honest participant is sufficient to maintain the confidentiality of the combined secret value. This state remains true even if all (n−1) other participants intentionally select non-random secret values).

Joint Zero Secret Sharing (JZSS) (Ben-Or, 1988)

JZSS is like JRSS, with the difference that each participant shares 0 as an alternative to the random value. The shares produced using this technique aid in removing any potential weak points in the JRSS algorithm.

Desmedt [1987] introduced the concept of group orientated cryptography. This process allowed a participant to send a message to a group of people in a manner that only allowed a selected subset of the participants to decrypt the message. In the system, the members were said to be known if the sender must know them using a public key and the group is anonymous if there is a single public key for the group that is held independently of the members. The system disclosed in the present application integrates both methodologies and allows for known and anonymous senders and signers to exist within a group simultaneously.

Method and Implementation

Initially, secure communication channels are established between participants in a manner described in detail in International Patent Application WO 2017/145016, so that data can be exchanged between participants without being made available to other participants.

When secure communication channels have been established between the participants, shares $d_{A(i)}$ of a first private key $d_A$ are distributed between a group of first participants by means of a method as described below.

Algorithm 1 Key Generation

Domain Parameters (CURVE, Cardinality n, Generator G)

Input: N/A
Output: Key Shares $d_{A1}, d_{A2} \ldots d_{AN}$

The method for algorithm 1 follows:

1) Each participant $p_{(i)}$ of (N) where $1 \leq i \leq N$ exchanges an ECC public key (or in this implementation, a Bitcoin address) with all other participants. This address is the Group identity address and does not need to be used for any other purpose.

It should be noted that this is a derived address, for example as disclosed in International patent application WO2017/145016, and key based on a shared value between each of the participants from the process disclosed therein.

2) Each participant $p_{(i)}$ selects a polynomial $f_i(x)$ of degree (k−1) with random coefficients in a manner that is secret from all other parties.

This function is subject to the participant's secret $a_0^{(i)}$ that is selected as the polynomial free term. This value is not shared. This value is calculated using a derived private key.

$f_i(h)$ is defined to be the result of the function, $f_{(x)}$ that was selected by participant $p_{(i)}$ for the value at point (x=h), and the base equation for participant $p_{(i)}$ is defined as the function: $f_{(x)} = \Sigma_{p=0}^{(k-1)} a_p x^p \bmod n$ In this equation, $a_0$ is the secret for each participant $p_{(i)}$ and is not shared.

Hence, each participant $p_{(i)}$ has a secretly kept function $f_i(x)$ that is expressed as the degree (k−1) polynomial with a free term $a_0^{(i)}$ being defined as that participant's secret such that:

$$f_{i(x)} = \Sigma_{\gamma=0}^{(k-1)} a_\gamma x^\gamma \bmod n$$

3) Each participant $p_{(i)}$ encrypts $f_i(h)$ to participant $P_{(h)}$ $\forall h = \{1, \ldots, (i-1), (i+1), \ldots, N\}$ using $P_{(h)}$'s public key as noted above and exchanges the value for $P_{(h)}$ to decrypt.

Given that $Z_n$ is a field and it is possible to validly do Lagrange interpolation modulo n over the values selected as ECC private keys, a condition exists which leads to the conclusion that Shamir's Secret Sharing Scheme SSSS [5] can be implemented over $Z_n$.

4) Each participant $P_{(i)}$ broadcasts the values below to all participants.
   a) $\alpha_\kappa^{(i)} G \; \forall \kappa = \{0, \ldots, (k-1)\}$
   b) $f_i(h)G \; \forall h = \{1, \ldots, N\}$ The value associated with the variable h in the equation above can either be the position of the participant $P_{(h)}$ such that if participant $P_{(h)}$ represents the third participant in a scheme, then h=3 or equally may represent the value of the ECC public key used by the participant as an integer. Use cases and scenarios exist for either implementation. In the latter implementation, the value $h = \{1, \ldots, N\}$ would be replaced by an array of values mapped to the individual participant's utilised public key.

5) Each participant $P_{(h \neq i)}$ verifies the consistency of the received shares with those received from each other participant. That is:

$$\Sigma_{\kappa=0}^{(k-1)} h^\kappa a_\kappa^{(i)} G = f_i(h) G$$

And that $f_i(h)G$ is consistent with the participant's share.

6) Each participant $P_{(h \neq i)}$ validates that the share owned by that participant $P_{(h \neq i)}$ and which was received is consistent with the other received shares:

$$a_0^{(i)} G = \Sigma_{h \in B} \beta_j f_i(h) G \; \forall \; P_{(h \neq i)}$$

In effect, this means that the participant carries out a process which would recover the shared secret from the received shares, but instead recovers the shared secret multiplied by the generator point G, from the shares multiplied by G. If this is not consistent, the participant rejects the protocol and starts again.

7) Participant $p_{(i)}$ now either calculates their share $d_{A(i)}$ as:
   $\mathrm{SHARE}(p_{(i)}) = d_{A(i)} = \Sigma_{h=1}^j f_h(i) \bmod n$
   Where: $\mathrm{SHARE}(p_{(i)}) \in Z_n$
   and
   Where: $Q_A = \mathrm{Exp\text{-}Interpolate}(f_1, \ldots, f_N) \; \triangleright \; [=G \times d_A]$
   Where the operation "Exp-Interpolate($f_1, \ldots, f_N$)" means carrying out an operation to recover the shared secret value $G \times d_A$, from the shares $f_1 \times G, \ldots f_N \times G$, in the manner usually used to recover a shared secret $d_A$, from the shares $f_1, \ldots f_N$, for example by means of interpolation using Lagrange coefficients in the case of a Shamir secret sharing scheme.

Return $(d_{A(i)}, Q_A)$

Participant $p_{(i)}$ now uses the share in calculating signatures. This role can be conducted by any participant or by a party $p_{(c)}$ that acts as a coordinator in the process of collecting a signature. The participant $p_{(c)}$ can vary and does not need to be the same party on each attempt to collect enough shares to sign a transaction.

Hence private key shares $d_{A(i)} \in Z^*_n$ have been created without knowledge of the other participant's shares.

Algorithm 2 Updating the private key

Input: Participant $P_i$'s share of private key $d_A$ denoted as $d_{A(i)}$.

Output: Participant $P_i$'s new private key share $d_{A(i)}'$.

Algorithm 2 can be used to both update the private key as well as to add randomness into the protocol.

1) Each participant selects a random polynomial of degree (k-1) subject to zero as its free term. This is analogous to Algorithm 1 but that the participants must validate that the selected secret of all other participants is zero.

It should be noted that: $\emptyset G = nG = 0$ where 0 is a point at infinity on the elliptic curve.

Using this equality, all active participants validate the function:

$$a_0^{(i)} = \emptyset \forall i = \{1, \ldots, N\}$$

Generate the zero share: $z_i \in Z^*_n$

2) $d_{A(i)}' = d_{A(i)} + z_i$

3) Return: $d_{A(i)}'$

A collection of participants construct private key shares $d_{A_1}, d_{A_2}, \ldots, d_{A_N}$ in accordance with algorithm 1. New key shares $Dk_1, Dk_2, \ldots, Dk_N$ are introduced to each participant in the collection. These shares may be constructed using algorithm 1 above in which a threshold share of participants may be able to construct a shared secret $D_k$ that is not previously known. Alternatively, $D_k$ may be known in advance (eg a deterministic key) and shares may be constructed in a manner similar to algorithm but such that a pre-known $D_k$ is chosen to be the free term in the polynomial. In either case, $Dk \otimes G$ is known to all but only a slice $Dk_1, Dk_2, \ldots, Dk_N$ is known by each of the participant in the collection.

As all participants know $1^{st}$ public key $$P_{1S} = d_A \otimes G$$

they can calculate $$P_{2S} = P_{1S} + Dk \otimes G$$

without broadcasting their slice of the $d_A$ or $Dk$, because the first $V_{1S}$ and second $V_{2S}$ private keys are related by $V_{2S} = V_{1S} + Dk$. The individual shares $$d_{A_1}, \ldots, d_{A_N} \text{ and } Dk_1, \ldots, Dk_N$$

remain known only to each individual participant.

A new address $P_{2S}$ can be created and a transaction tx signed to this, that changes who controls the main funds. That is, a payment from $P_{1S}$ to $P_{2S}$ can be signed by members of address $P_{1S}$.

The $D_k$ collection can be set as either a group from $P_{1S}$ collection (either a threshold number or all members) or may be a new group. Each threshold slice of $D_k$ is able to be assigned separately, but it should be remembered that if $P_{1S}$ and $D_k$ are controlled separately then this creates a dual signing structure where both $P_{1S}$ and $D_k$ are required at the respective threshold rates to sign a transaction tx. It should also be noted that $P_{1S}$ and $D_k$ do not require the same members nor the same proportions.

Algorithm 3 Signature Generation

Input:

Message to be signed $$e = H(m).$$

Private key share $$d_{A_1}, \ldots, d_{A_N} \text{ where } d_{A_i} \in Z^*_n.$$

Deterministic key share $$Dk_1, \ldots, Dk_N \text{ where } Dk_i \in Z^*_n.$$

The private key shares $d_{A_1}, \ldots, d_{A_N}$ are generated by means of algorithm 1. The deterministic key shares $Dk_1, \ldots, Dk_N$ are generated by means of algorithm 1 using a random constant as the free term in the polynomial or using a pre-known deterministic key $D_k$ as the free term.

Output:

Signature $$(r, s) \text{ where } r, s \in Z^*_n.$$

The signatures are generated using a method which incorporates both the shares of the private key $d_A$ and shares of the deterministic key $D_k$ into the signature. This is described in detail as follows.

Firstly, each participant generates ephemeral key shares using algorithm 1

$$k_i \in Z^*_n.$$

Next mask shares are generated using algorithm 1 above $$\alpha_i \in Z^*_n$$

and zero mask shares are generated using algorithm 2 above $$\beta_i \in Z_n, c_i \in Z^*_n.$$

Each participant knows $k_i$, $\alpha_i$, $\beta_i$, $c_i$ and they are not known to anyone else.

1)

$$e = H(m)$$

Distribute the message (transaction to be signed). Broadcast $$v_i = k_i \alpha_i + \beta_i \mod n$$

and $$\omega_i = G \otimes \alpha_i.$$

2) Calculate $\mu := \text{Interpolate}(v_1, \ldots, v_N) \mod n$

▷ $[= k\alpha \mod n]$ where $\alpha$ is the private key corresponding to the mask shares $\alpha_i$, and the operation "Interpolate $(v_1, \ldots v_N)$" means obtain the shared secret $\mu$ from the shares $v_1, \ldots v_N$, for example by using Lagrange interpolation coefficients.

3) Calculate $\theta := \text{Exp-Interpolate}(\omega_1, \ldots, \omega_N) \mod n$ ▷ $[= G \otimes \alpha]$.

4) Calculate $(R_x, R_y)$ where $$R_{xy} := (R_x, R_y) = \theta \otimes \mu^{-1}.$$

▷ $[= G \otimes k^{-1}]$.

5) Define $$r := r_x = R_x \bmod n.$$

If r=0 start over.
6)
Broadcast $$S_i := k_i(e + [d_{A_i} + Dk_i]r) + c_i \bmod n.$$

Note that if $d_{A_i}$ and $Dk_i$ represent different collections of participants then two participants from each collection must communicate to broadcast each individual $S_i$.
7)

$$s := \text{Interpolate}(S_1, \ldots, S_M) \bmod n$$

▷ $[= k(e + [d_A + Dk]r) \bmod n].$

If S=0 start over.
8) Return (r,s).
9) Construct a transaction that comes from $P_{2S} = (d_A + Dk) \otimes G$. This is a standard Bitcoin transaction with an (r,s) signature. At no point have $d_A$ or $D_k$ been reconstructed (unless $D_k$ has been split from an existing known value).

Referring to FIG. 1, a method embodying the invention for transferring control of a digital asset 2 such as a quantity of cryptocurrency such as Bitcoin is described. Initially shares $d_{Ai}$ of a first private key $d_A$ are distributed using algorithm 1 above among a plurality of first participants 4. In order to transfer the asset 2 to a third party 14, the first private key $d_A$ is accessible by means of a first threshold number 6 of shares $d_{Ai}$ of the first private key $d_A$, and is inaccessible in the absence of the first threshold number 6 of shares $d_{Ai}$ of the first private key $d_A$. Shares $D_{ki}$ of a deterministic key $D_k$ are distributed among the plurality of second participants 4, such that the deterministic key $D_k$ is accessible by means of a second threshold number 10 of shares $D_{ki}$ of the deterministic key $D_k$, and is inaccessible in the absence of the second threshold number 10 shares $D_{ki}$. After generating signature shares $S_i$ according to the process of algorithm 3 described above, access to the digital asset 2 is provided by digital signature with a second private key $d_A + D_k$ based on a third threshold number 12 of signature shares $S_i$.

Turning now to FIG. 2, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 2, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 2 is intended only as a specific example for purposes of illustrating the preferred embodiment of the device. Many other configurations having more or fewer components than the system depicted in FIG. 2 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

REFERENCES

1) Ben-Or, M., Goldwasser, S., Wigderson, A.: "*Completeness theorems for noncryptographic fault-tolerant distributed computation*". In: Proceedings of the Twentieth Annual ACM Symposium on Theory of Computing. pp. 1-10. STOC '88, ACM, New York, N.Y., USA (1988)
2) Chaum, David (1983). "*Blind signatures for untraceable payments*" (PDF). Advances in Cryptology Proceedings of Crypto. 82 (3): 199-203.
3) Desmedt. Yuo (1987). "Society and Group Oriented Cryptography: A New Concept". In A Conference on the Theory and Applications of Cryptographic Techniques on Advances in Cryptology (CRYPTO '87), Carl Pomerance (Ed.). Springer-Verlag, London, UK, UK, 120-127.
4) Feldman. P. "*A practical scheme for non-interactive verifiable secret sharing*". In Proceedings of the 28th IEEE Annual Symposium on Foundations of Computer Science, pages 427-437, 1987.
5) Gennaro, R., Jarecki, S., Krawczyk, H., Rabin, T.: "*Robust threshold DSS signatures*". In: Proceedings of the 15th Annual International Conference on Theory and Application of Cryptographic Techniques. pp. 354-371. EUROCRYPT '96, SpringerVerlag, Berlin, Heidelberg (1996)
6) Ibrahim, M., Ali, I., Ibrahim, I., El-sawi, A.: "*A robust threshold elliptic curve digital signature providing a new verifiable secret sharing scheme*". In: Circuits and Systems, 2003 IEEE 46th Midwest Symposium on. vol. 1, pp. 276-280 (2003)
7) Pedersen, T.: "*Non-interactive and information-theoretic secure verifiable secret sharing*". In: Feigenbaum, J. (ed.) Advances in Cryptology—CRYPTO '91, LNCS, vol. 576, pp. 129-140. Springer (1992)
8) Shamir, Adi (1979), "*How to share a secret*", Communications of the ACM, 22 (11): Pp. 612-613

The invention claimed is:

1. A computer-implemented method of transferring control of a digital asset, the method comprising:
distributing shares of a first secret value among a plurality of first participants, wherein said first secret value is a first private key of a first private-public key pair of a cryptography system having a homomorphic property, said first secret value is accessible by way of a first threshold number of said shares of said first secret value, and is inaccessible in the absence of said first threshold number of said shares of said first secret value, and access to said digital asset is provided by digital signature of a first encrypted message with said first private key;
distributing shares of a second secret value among said plurality of first participants, wherein said second secret value is a deterministic key of said cryptography system, said second secret value is accessible by way of a second threshold number of said shares of said second secret value, and is inaccessible in the absence of said second threshold number of said shares of said second secret value;
providing a second encrypted message, wherein access to said digital asset is provided by a digital signature of said second encrypted message with a second private key of a second private-public key pair of said cryptography system and wherein said second private key is related to said first private key by said deterministic key; and
generating shares of a third secret value, wherein said third secret value is said second encrypted message signed with said second private key, and wherein said second encrypted message can be signed with said second private key by way of a third threshold number of said shares of said third secret value, and cannot be signed in the absence of said third threshold number of said shares of said third secret value.

2. The computer-implemented method according to claim 1, further comprising distributing a version of said deterministic key, encrypted by way of said cryptography system, to a plurality of second participants, wherein said homomorphic property enables derivation of a second public key of the second public-private key pair from a first public key of the first public-private key pair and said version of said deterministic key.

3. The computer-implemented method according to claim 1, wherein the shares communicated to each said first and/or second participant of the pluralities of first and second participants are inaccessible to each other said first and/or second participant of the pluralities of first and second participants.

4. The computer-implemented method according to claim 1, wherein the step of communicating said shares to each said first and/or second participant of the pluralities of first and second participants comprises providing a respective encrypted communication channel with said first and/or second participant.

5. The computer-implemented method according to claim 1, wherein the step of distributing shares of said first secret value comprises:
distributing first shares of a fourth secret value, known to a third participant, to a plurality of fourth participants, wherein said first shares are encrypted by way of at least one third private-public key pair of said cryptography system, wherein a fourth threshold number of said first shares is required in order to enable a fourth participant of the plurality of fourth participants to determine the fourth secret value;
receiving, from each of plurality of fourth participants, at least one second share of a fifth secret value known to said fourth participant, wherein said second shares are encrypted by way of at least one fourth private-public key pair of said cryptography system, and a fifth threshold number of second shares is required to enable a participant other than said fourth participant to determine the fifth secret value; and
forming, from a plurality of said second shares, a third share of said first secret value, wherein said first threshold number of third shares is required in order to enable the first secret value to be determined.

6. The computer-implemented method according to claim 5, wherein the first and second shares of said fourth and fifth secret values are created by way of respective Shamir secret sharing schemes.

7. The computer-implemented method according to claim 5, further comprising communicating versions of said first shares, encrypted by way of said cryptography system, to each of said plurality of fourth participants.

8. The computer-implemented method according to claim 5, further comprising determining a version of said first secret value, encrypted by way of said cryptography system.

9. The computer-implemented method according to claim 5, wherein a plurality of said first shares includes respective values of a first polynomial function, and the first secret value is determined by deriving the first polynomial function from said first threshold number of said shares.

10. The computer-implemented method according to claim 5, wherein a plurality of said first shares includes respective values of a second polynomial function, and the method further comprises communicating versions of coefficients of said second polynomial function, encrypted by way of said cryptography system, to each of said plurality of fourth participants.

11. The computer-implemented method according to claim 5, further comprising verifying consistency of said first shares received directly from said third participant with versions of said first shares, encrypted by way of said cryptography system and received from said plurality of fourth participants.

12. The computer-implemented method according to claim 5, further comprising verifying consistency of versions of said first shares, encrypted by way of said cryptography system and received from a fourth participant of the plurality of fourth participants with versions of said first shares, encrypted by way of said cryptography system and received from another fourth participant of the plurality of fourth participants.

13. The computer-implemented method according to claim 5, further comprising the step of distributing fourth shares of a sixth secret value, having value zero, to the plurality of fourth participants, wherein said fourth shares are encrypted by way of at least one fifth private-public key pair of said cryptography system.

14. The computer-implemented method according to claim 13, further comprising receiving a fourth share of said fourth shares from said fourth participant, and forming, from a third share of said third shares and said fourth share, a fifth share of said first secret value, wherein a sixth threshold number of fifth shares is required in order to enable the first secret value to be determined.

15. The computer-implemented method according to claim 5, wherein said first secret value is shared among said plurality of first participants by way of joint random secret sharing (JRSS).

16. The computer-implemented method according to claim 15, wherein sharing said first secret value includes sharing a masking share generated by joint zero secret sharing (JZSS).

17. The computer-implemented method according to claim 1, wherein the cryptography system is an elliptic curve cryptography system, a public key of each of said first and second public-private key pairs is related to a corresponding private key by multiplication of an elliptic curve generator point by said corresponding private key, and said second private key is related to said first private key by addition of said deterministic key to said first private key.

18. A computer-implemented system comprising:
a processor; and
memory including executable instructions that, as a result of execution by the processor, causes the computer-implemented system to transfer control of a digital asset at least by:
distributing shares of a first secret value among a plurality of first participants, wherein said first secret value is a first private key of a first private-public key pair of a cryptography system having a homomorphic property, said first secret value is accessible by way of a first threshold number of said shares of said first secret value, and is inaccessible in the absence of said first threshold number of said shares of said first secret value, and access to said digital asset is provided by digital signature of a first encrypted message with said first private key;
distributing shares of a second secret value among said plurality of first participants, wherein said second secret value is a deterministic key of said cryptography system, said second secret value is accessible by way of a second threshold number of said shares of said second secret value, and is inaccessible in the absence of said second threshold number of said shares of said second secret value;
providing a second encrypted message, wherein access to said digital asset is provided by a digital signature of said second encrypted message with a second private key of a second private-public key pair of said cryptography system and wherein said second private key is related to said first private key by said deterministic key; and
generating shares of a third secret value, wherein said third secret value is said second encrypted message signed with said second private key, and wherein said second encrypted message can be signed with said second private key by way of a third threshold number of said shares of said third secret value, and cannot be signed in the absence of said third threshold number of said shares of said third secret value.

19. A non-transitory computer-readable storage medium having stored thereon executable instructions that, as a result of being executed by a processor of a computer system, cause the computer system to transfer control of a digital asset at least by:
distributing shares of a first secret value among a plurality of first participants, wherein said first secret value is a first private key of a first private-public key pair of a cryptography system having a homomorphic property, said first secret value is accessible by way of a first threshold number of said shares of said first secret value, and is inaccessible in the absence of said first threshold number of said shares of said first secret value, and access to said digital asset is provided by digital signature of a first encrypted message with said first private key;
distributing shares of a second secret value among said plurality of first participants, wherein said second secret value is a deterministic key of said cryptography system, said second secret value is accessible by way of a second threshold number of said shares of said second secret value, and is inaccessible in the absence of said second threshold number of said shares of said second secret value;
providing a second encrypted message, wherein access to said digital asset is provided by a digital signature of said second encrypted message with a second private key of a second private-public key pair of said cryptography system and wherein said second private key is related to said first private key by said deterministic key; and
generating shares of a third secret value, wherein said third secret value is said second encrypted message signed with said second private key, and wherein said second encrypted message can be signed with said second private key by way of a third threshold number of said shares of said third secret value, and cannot be signed in the absence of said third threshold number of said shares of said third secret value.

20. The computer-implemented system
according to claim 18, wherein the step of distributing shares of said first secret value comprises:
distributing first shares of a fourth secret value, known to a third participant, to a plurality of fourth participants, wherein said first shares are encrypted by way of at least one third private-public key pair of said cryptography system, wherein a fourth threshold number of said first shares is required in order to enable a fourth participant of the plurality of fourth participants to determine the fourth secret value;
receiving, from each of plurality of fourth participants, at least one second share of a fifth secret value known to said fourth participant, wherein said second shares are encrypted by way of at least one fourth private-public key pair of said cryptography system, and a fifth threshold number of second shares is required to enable a participant other than said fourth participant to determine the fifth secret value; and
forming, from a plurality of said second shares, a third share of said first secret value, wherein said first threshold number of third shares is required in order to enable the first secret value to be determined.

* * * * *